(12) United States Patent
Maruyama et al.

(10) Patent No.: US 6,669,860 B1
(45) Date of Patent: Dec. 30, 2003

(54) SOLID ELECTROLYTE, ELECTROCHEMICAL DEVICE, LITHIUM ION SECONDARY BATTERY, AND ELECTRIC DOUBLE-LAYER CAPACITOR

(75) Inventors: Satoshi Maruyama, Tokyo (JP); Hisashi Suzuki, Tokyo (JP); Kozo Sakurai, Tochigi (JP); Masakatsu Kujira, Tochigi (JP); Takamasa Yamamoto, Tochigi (JP)

(73) Assignees: TDK Corporation, Tokyo (JP); Toyo Roshi Kaisha, Ltd., Tokyo (JP)

( * ) Notice: Subject to any disclaimer, the term of this patent is extended or adjusted under 35 U.S.C. 154(b) by 124 days.

(21) Appl. No.: 09/671,011

(22) Filed: Sep. 28, 2000

(30) Foreign Application Priority Data

Sep. 29, 1999 (JP) .............................. 11-276298

(51) Int. Cl.[7] .............................. H01G 9/025
(52) U.S. Cl. ............. 252/62.2; 429/304; 429/316; 429/326; 361/502
(58) Field of Search ............ 429/30, 304, 306, 429/309, 324, 323, 326, 316; 252/62.2; 361/502

(56) References Cited

U.S. PATENT DOCUMENTS

| | | | | |
|---|---|---|---|---|
| 4,849,311 A | * | 7/1989 | Itoh et al. ................ | 429/192 |
| 5,300,374 A | * | 4/1994 | Agrawal et al. ............ | 429/192 |
| 5,547,551 A | * | 8/1996 | Bahar et al. ................ | 204/296 |
| 5,705,084 A | * | 1/1998 | Kejha ........................ | 252/62.2 |
| 5,756,230 A | | 5/1998 | Gao et al. | |
| 5,783,325 A | * | 7/1998 | Cabasso et al. ............ | 429/42 |
| 5,849,433 A | * | 12/1998 | Venugopal .................. | 429/190 |
| 5,858,264 A | * | 1/1999 | Ichino et al. ............. | 252/62.2 |
| 5,922,493 A | | 7/1999 | Humphrey, Jr. et al. | |
| 6,037,080 A | | 3/2000 | Kronfli et al. | |

* cited by examiner

*Primary Examiner*—Patrick Ryan
*Assistant Examiner*—Julian Mercado
(74) *Attorney, Agent, or Firm*—Oblon, Spivak, McClelland, Maier & Neustadt, P.C.

(57) ABSTRACT

A solid electrolyte comprises a microporous film having high crystallizability and excellent solvent resistance. The microporous film is controlled by a wet phase inversion method to a porosity of 50% or greater and a pore diameter of 0.02 μm to 1 μm inclusive. The solid electrolyte may be used to construct an electrochemical device, a lithium ion secondary battery and an electric double-layer capacitor.

16 Claims, 1 Drawing Sheet

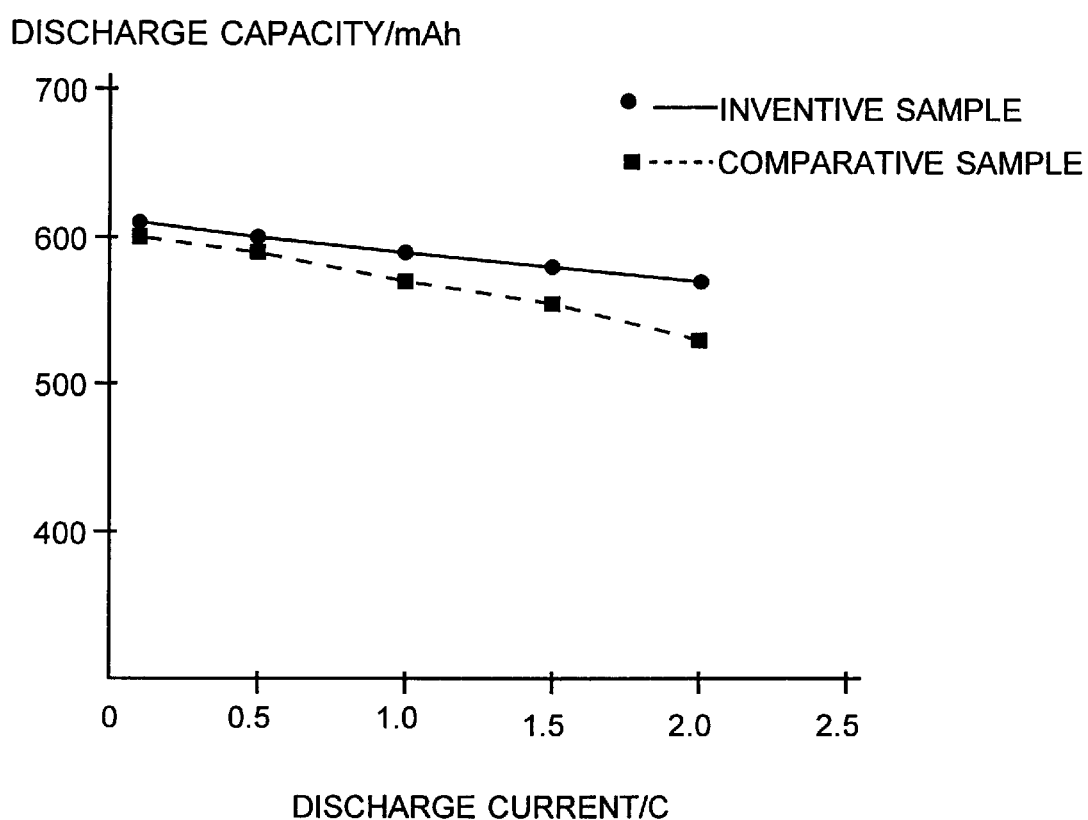

SOLID ELECTROLYTE, ELECTROCHEMICAL DEVICE, LITHIUM ION SECONDARY BATTERY, AND ELECTRIC DOUBLE-LAYER CAPACITOR

BACKGROUND OF THE INVENTION

The present invention relates to a solid electrolyte making use of a microporous film of polymeric material. This microporous film may be used as a solid electrolyte material for batteries or as a solid electrolyte material for electric double-layer capacitors, and may be applied to an electrochemical device making use of electrochemical reactions as well. By the term "electrochemical device" used herein is intended a device harnessing electrochemical reactions.

Electrochemical devices such as batteries, electric double-layer capacitors and electrochromic display devices are known as devices harnessing electrochemical reactions.

Various forms of batteries are now widely used in fields from electronics to automobiles, or they are provided in a large form for power storage purposes. In such batteries, electrolysis solutions are ordinarily used for electrolytes. Batteries using solid electrolytes instead of liquid electrolytes, on the other hand, attract attention as next-generation batteries, because leakage problems can be eliminated or a sheet form of batteries can be achieved.

Especially if lithium ion secondary batteries, etc. now increasingly used in the field of portable equipment such as notebook PCs are available in a sheet form or a slimmed-down laminate form, then their drastic application and development are expectable.

Various materials such as ceramic materials, polymeric materials and composite materials using both materials are put forward for such solid electrolytes. In particular, gel electrolytes obtained by plasticizing polymeric electrolytes using an electrolysis solution are thought of as holding great promise in view of the development of electrolytes, because they combine the high conductivity of a solution system with the flexibility of a polymeric material. One of the merits of batteries using such polymeric electrolytes is that they can be slimmed down with a large area or, in another parlance, can be used in a sheet form. This will spur the application and development of batteries. Examples of application of such gelled electrolyte materials to battery materials reported so far in the art have already been disclosed in U.S. Pat. No. 3,989,540. In more recent years, batteries making use of plasticized PVDF type copolymers have been known typically from U.S. Pat. Nos. 5,296,318 and 5,418,091. In particular, the batteries disclosed in U.S. Pat. Nos. 5,296,318 and 5,418,091 are found to be superior in discharge performance to conventional batteries using gel electrolytes, and batteries having very excellent rate performance are available as shown in U.S. Pat. No. 5,540,741.

However, the material system set forth in U.S. Pat. Nos. 5,296,318, 5,418,091 and 5,540,741 has a production problem although it has good rate performance. In other words, the PVDF type copolymer used in this system is more deformable, and lower in strength, than a homopolymer of the same PVDF type, because the copolymer is more easily swollen with an electrolysis solution and because of copolymerization. This is a problem resulting from the copolymerization of PVDF. The problem is due to low crystallizability, and is believed to be derived from the inherent nature of the material. As a result, a practically usable thickness must be at least 60 $\mu$m. Thus, there is no denying that this material system is unfavorable when compared with the fact that the separator used with a conventional lithium ion battery using a solution is usually of the order of 25 $\mu$m in thickness. As the capacity of a battery increases, the thickness of the battery becomes a graver problem than that of a solution type battery. Thus, it is still impossible to take full advantage of the battery using a gel electrolyte in reducing the thickness of the battery.

Another problem with the aforesaid material system is that the PVDF copolymer becomes locally thin due to the encroachment on the gel electrolyte of an expanded metal used as a collector, resulting possibly in a short circuit that is a grave obstacle to battery production.

In addition, it has been found that when the PVDF type copolymer impregnated with an electrolysis solution is stored at high temperatures, the electrolysis solution is released from the copolymer, unlike the homopolymer.

In short, the problems associated with the gelled electrolyte using the PVDF type copolymer are that:
1. its strength is low,
2. it is very difficult to fabricate an electrolyte having a thickness of 60 $\mu$m or less,
3. a short circuit is likely to occur, and
4. it is poor in high-temperature performance.

One object of the present invention is to provide a solid electrolyte using a microporous film of high crystallizability and high strength. Another object of the invention is to use this solid electrolyte, thereby achieving an electrochemical device, a lithium ion secondary battery and an electric double-layer capacitor which can be further slimmed down and reduced in terms of the occurrence of short circuits with improved battery performance.

Yet another object of the present invention is to achieve an electrochemical device, a lithium ion secondary battery and an electric double-layer capacitor comprising a solid electrolyte using as an electrolyte film a microporous film having a suitable porosity without recourse to any plasticizer or the like.

In view of the aforesaid problems, the inventors have intensive studies to find out PVDF type a homopolymer material system that can eliminate the demerits of the PVDF type copolymer and make up for the demerits of the PVDF homopolymer.

As a result of studies made on the following three points, the inventors have now found that a solid electrolyte having functions equivalent to those set forth in the aforesaid prior art publications can be obtained by making improvements therein:

(1) a sheet form of film comprising a ceramic material,
(2) a film with PVDF homopolymer particles dispersed therein, and
(3) an improvement in the adhesion of a PVDF homopolymer microporous film to an electrode.

According to the present invention, an excellent solid electrolyte can be obtained through studies made on the aforesaid point (3). The microporous film in the solid electrolyte obtained according to the invention is quite different in structure from known film materials, because such plasticizers as shown in the prior art publications are not used at all.

That is to say, it is found as a result of close studies on the gel electrolytes known so far in the art that, in principle, they are generally broken down into the following three types:
1. An electrolyte film obtained by the swelling of chemical gel or physical gel.
2. An electrolyte film wherein a microporous film is simultaneously formed by a plasticizer. This amounts to a structure wherein micropores are present in the gelled film according to (1) above and both the gelled film and the microporous film function as an electrolyte. This electrolyte film corresponds to the solid electrolyte using the plasticizer disclosed in the aforesaid known examples.

3. A microporous film. This is characterized in that micropores exist in a three-dimensional manner, and the film material can be swollen with an electrolysis solution to retain the solution therein. These micropores are larger in pore diameter than those in the aforesaid electrolyte film (2).

SUMMARY OF THE INVENTION

The aforesaid object is achievable by the following embodiments.

(1) A solid electrolyte comprising a microporous film having high crystallizability and excellent solvent resistance, wherein:

said microporous film is controlled by a wet phase inversion method to a porosity of 50% or greater and a pore diameter of 0.02 µm to 2 µm inclusive.

(2) The solid electrolyte according to (1) above, wherein said wet phase inversion method allows a film-forming raw solution to be solidified in a solution obtained by mixing a phase-inverting organic solvent and water at a weight ratio of 100:0 to 60:40.

(3) The solid electrolyte according to (1) or (2) above, wherein said microporous film is formed of a material having a melt viscosity of 1,500 Pa·s$^{-1}$ (230° C., 100 s$^{-1}$) or greater.

(4) The solid electrolyte according to any one of (1) to (3) above, wherein said microporous film is formed of a material having a melting point of 150° C. or greater and a heat of fusion of 30 J/g or greater.

(5) The solid electrolyte according to any one of (1) to (4) above, wherein said microporous film is formed of a poly (vinylidene fluoride) homopolymer.

(6) An electrochemical device comprising a solid electrolyte as recited in any one of (1) to (5) above.

(7) The electrochemical device according to (6) above, which is a lithium ion secondary battery.

(8) The electrochemical device according to (6) above, which is an electric double-layer capacitor.

(9) A solid electrolyte production process, wherein a solution of a raw material dispersed and dissolved in an organic solvent is solidified in a solution obtained by mixing a phase-inverting organic solvent and water at a weight ratio of 100:0 to 60:40 to obtain a microporous film having a porosity of 50% or greater and a pore diameter of 0.02 µm to 2 µm inclusive.

(10) The solid electrolyte production process according to (9) above, wherein the raw material for said microporous film is a poly(vinylidene fluoride) homopolymer.

BRIEF DESCRIPTION OF THE DRAWINGS

FIG. 1 is a graph illustrating the charge/discharge performance of the inventive and comparative samples.

PREFERRED EMBODIMENTS OF THE INVENTION

The solid electrolyte of the present invention comprises a microporous film having high crystallizability and excellent solvent resistance. This microporous film has a porosity of 50% or greater and a pore diameter of 0.02 µm to 2 µm inclusive.

By controlling the porosity and pore diameter of the microporous film to the predetermined values, it is thus possible to obtain a solid electrolyte having excellent properties.

The microporous film should have a porosity of 50% or greater, preferably 50 to 90%, and more preferably 70 to 80%, and a pore diameter of 0.02 µm to 2 µm inclusive, preferably 0.02 µm to 1 µm inclusive, more preferably 0.04 µm to 0.8 µm inclusive, even more preferably 0.1 µm to 0.8 µm inclusive, and ever more preferably 0.1 µm to 0.6 µm inclusive. The microporous film should also have a thickness of preferably 20 to 80 µm, and more preferably 25 to 45 µm.

The microporous film should preferably be formed of a material having a melting point of 150° C. or greater, especially 160 to 170° C. and a heat of fusion of preferably 30 J/g or greater, especially 40 to 60 J/g.

Preferably but not exclusively, the microporous film having high crystallizability and excellent solvent resistance should comprise a fluorine type resin in general, and a resin containing a vinylidene fluoride unit in particular.

Preferred for such a fluorine type polymer, for instance, are a poly(vinylidene fluoride) (PVDF), a vinylidene fluoride-hexafluoropropylene (HFP) copolymer [P(VDF-HFP)], a vinylidene fluoride-chlorotrifluoroethylene (CTFE) copolymer [P(VDF-CTFE)], vinylidene fluoride-hexafluoropropylene fluorine rubber [P(VDF-HFP)], vinylidene fluoride-tetrafluoroethylene-hexafluoropropylene fluorine rubber [P(VDF-TFE-HFP)], and vinylidene fluoride-tetrafluoroethylene-perfluoroalkylvinyl ether fluorine rubber, among which the poly(vinylidene fluoride) homopolymer is particularly preferred.

The microporous film used herein may be formed by the wet phase inversion method mentioned below.

By the wet phase inversion method referred to herein is intended a solution casting method for film formation, wherein phase inversion is carried out in a solution. More exactly, a polymer capable of forming a microporous film is first dissolved in a solvent in which the polymer is dissoluble, and the obtained film-forming raw solution is then uniformly coated on a substrate such as a metal or plastic film. Following this, the film-forming raw solution cast in a film form is introduced in a solution called a formation bath, wherein the microporous film is obtained by phase inversion. The coating of the film-forming raw solution may be carried out in the formation bath.

Adhesive Agent

It is acceptable to use an adhesive agent for the purpose of improving the adhesion between the aforesaid microporous film and an associated electrode. For instance, use may be made of polyolefinic adhesives such as UNISTALL (made by Mitsui Chemical Industries, Ltd.), SBR (made by Nippon Zeon Co., Ltd.), AQUATEX (Chuo Rika Co., Ltd.) and ADCOAT (Morton Co., Ltd.), among which AQUATEX is preferred.

The adhesive agent is dissolved or dispersed in water or an organic solvent such as toluene for deposition and fixation to the microporous film by spreading, coating or the like.

Electrolysis Solution

Generally, an electrolysis solution comprises an electrolyte salt and a solvent. With applications of the solid electrolyte to a lithium battery in mind, the electrolyte salt must contain lithium. For instance, use may be made of electrolyte salts such as $LiPF_6$, $LiClO_4$, $LiBF_4$, $LiAsF_6$, $LiSO_3CF_3$, and $LiN(CF_3SO_2)_2$. When the solid electrolyte is used for an electric double-layer capacitor, the aforesaid Li-containing alkaline metal salts as well as quaternary ammonium salts such as an ammonium salt of tetraethyl perchlorate and an ammonium salt of tetraethyl borofluoride may be used. Alternatively, an appropriate selection may be made from electrolyte salts compatible with the solvent to be described later, depending on the electrochemical device to which the solid electrolyte is applied. Such electrolyte salts may be used alone or in combination of two or more at given mixing ratios.

For the organic solvent for the electrolyte, any desired solvent well compatible with the aforesaid polymeric material and electrolyte salt may be used. With applications of the solid electrolyte to electrochemical devices such as lithium batteries and capacitors in mind, however, it is preferable to use a solvent that undergoes no decomposition even at high applied voltages, for instance, carbonates such as ethylene carbonate (EC), propylene carbonate (PC), butylene carbonate, dimethyl carbonate (DMC), diethyl carbonate and ethyl methyl carbonate, cyclic ethers such as tetrahydrofuran (THF) and 2-methyltetrahydrofuran, cyclic ethers such as 1,3-dioxolan and 4-methyldioxolan, lactones such as γ-butyrolactone, sulfolane, 3-methylsulfolane, dimethoxyethane, diethoxyethane, ethoxymethoxyethane and ethyldiglime. These may be used alone or in admixture. Alternatively, an appropriate selection may be made from known solvents depending on the devices to which the solid electrolyte is applied.

The concentration of the electrolyte salt in the electrolysis solution should preferably be 0.3 to 5 mol/l. Usually, the highest conductivity is obtained in the vicinity of 1 mol/l.

The electrolysis solution should preferably account for 30 to 70% by weight, and especially 40 to 60% by weight, of the solid electrolyte. At a higher concentration of the electrolysis solution, the electrolysis solution is in excess, resulting in an unfavorable increase in the weight of the battery when it is fabricated. At a lower concentration, it is difficult to obtain sufficient ionic conductivity.

Solid Electrolyte

The solid electrolyte of the present invention should have a thickness of preferably 5 to 100 μm, more preferably 5 to 60 μm, and even more preferably 10 to 40 μm. The solid electrolyte of the invention, because of having high strength, can be used in a thinner form. The solid electrolyte of the invention can be made thinner than a conventional gel electrolyte that cannot practically have a thickness of 60 μm or less, and than a separator (of usually 25 μm in thickness) used with a solution type lithium ion battery. For this reason, it is possible to achieve a thin yet large-area arrangement that is one of the advantages of the solid electrolyte, i.e., a sheet form of arrangement.

The solid electrolyte of the present invention should preferably have an as-dried porosity of 30% or greater, and especially 45% or greater before impregnated with the electrolysis solution. At a lower porosity, the electrolysis solution cannot sufficiently be held, resulting in a drop of ionic conductivity and a deterioration in rate performance. The upper limit to porosity is usually 70% or less. Too high a porosity makes the strength of the solid electrolyte unsatisfactory. It is here noted that the porosity may be measured by Archimedes method.

The solid electrolyte should preferably have an average pore diameter of 0.05 to 2 μm, and especially 0.1 to 0.8 μm. Usually, this pore diameter is larger than that of a conventional gel electrolyte. As the average pore diameter is larger than the upper limit, it is difficult to keep uniform pore diameters, resulting possibly in the occurrence of lithium dendrite. At a smaller diameter, a problem may possibly arise in connection with the dispersion of Li ions. The pore diameter may be measured with a mercury porosimeter.

Production Process

One embodiment of the solid electrolyte production process according to the present invention is now explained.

Five (5) to forty (40) wt %, preferably 10 to 30 wt %, and more preferably 15 to 25 wt %, of the polymer capable of providing a microporous film is dissolved in 60 to 95 wt %, preferably 70 to 90 wt %, and more preferably 75 to 85 wt %, of a solvent for the polymer (an organic solvent). When the polymer concentration is less than 5% by weight, the resulting film decreases in strength due to too high a porosity. When the polymer concentration exceeds 40% by weight, on the contrary, the film-forming raw solution becomes high in viscosity and so unstable, with a film-forming capability drop.

For the solvent in which the polymer is to be dissolved, good solvents and/or poor solvents for polymers are generally used. However, it is acceptable to mix a non-solvent with these solvents. The obtained film-forming raw solution is uniformly cast onto a substrate by a doctor blade method. For the substrate, glass plates, stainless sheets, and plastic films such as poly(ethylene terephthalate) films or polypropylene films may be used.

Immediately upon casting, the substrate is immersed in the formation bath for phase inversion. The period of time from casting to immersion in the formation bath is less than 3 minutes, and preferably less than 1 minute. Alternatively, casting may be carried out in the formation bath. When the casting-to-immersion time exceeds 3 minutes, the surface of the resulting film is likely to become non-microporous, although depending on the composition of the film-forming raw solution. For the solution used for the formation bath, non-solvents and good solvents and/or poor solvents for polymers may be used or non-solvents alone may be used. The type of the solution used is determined by phase inversion speed and washing time for solvent removal.

After the completion of phase inversion, the film is removed from the formation bath, if required, followed by washing for solvent removal, and then dried in any desired drying means such as an oven to obtain a microporous film.

The good solvents for polymers, for instance, include dimethylacetamide, dimethylformamide, N-methyl-2-pyrrolidone and dimethyl sulfoxide, although varying with the type of polymer. The poor solvents, for instance, include ketones such as acetone and methyl ethyl ketone and ethers such as dioxane and tetrahydrofuran, and the non-solvents, for instance, include water as well as alcohols such as methanol and ethanol.

Then, the film is immersed in the electrolysis solution, so that it can be impregnated with the electrolysis solution, thereby obtaining the solid electrolyte according to the present invention.

Electrochemical Device

The solid electrolyte of the present invention may be used for electrochemical devices such as lithium secondary batteries, electric double-layer capacitors, EC displays and sensors. More preferably, the present solid electrolyte should be used for lithium secondary batteries and electric double-layer capacitors.

Lithium Secondary Battery

No particular limitation is imposed on the structure of a lithium secondary battery using the solid electrolyte according to the present invention. Usually, the solid electrolyte of the invention is applied to laminated, cylindrical or other batteries comprising a cathode, an anode and the solid electrolyte according to the invention.

For the electrode used in combination with the solid electrolyte, an appropriate selection may be made from those known for lithium secondary batteries. Preferably, however, the electrode used should have a composition comprising an electrode active substance and a gel electrolyte, if required, with an electrically conductive aid.

For the anode it is preferable to use an anode active substance such as a carbonaceous material, lithium metal, a lithium alloy or an oxide material, and for the cathode it is preferable to use a cathode active substance such as an oxide or carbonaceous material capable of intercalating or deintercalating lithium ions. By use of such electrodes, it is possible to obtain a lithium secondary battery of improved performance.

For the carbonaceous material used as the electrode active substance, for instance, an appropriate selection may be made from mesocarbon microbeads (MCMB), natural or artificial graphite, resin-fired carbonaceous material, carbon black and carbon fibers. These materials may be used in powdery forms. Among others, it is preferable to use graphite having an average particle diameter of 1 to 30 $\mu$m, and especially 5 to 25 $\mu$m. Too small an average particle diameter is likely to cause charge/discharge cycle life to become short and capacity variations (from battery to battery) to become large. Too large an average particle diameter results in extraordinarily increased capacity variations and, hence, a decrease in average capacity. Capacity variations due to an increased average particle diameter are believed to be because of contact of graphite with a collector or varying contact of graphite particles with one another.

For the oxide capable of intercalating or deintercalating lithium ions, it is preferable to use a composite oxide containing lithium, for instance, $LiCoO_2$, $LiMn_2O_4$, $LiNiO_2$ and $LiV_2O_4$. These oxide powders should preferably have an average particle diameter of the order of 1 to 40 $\mu$m.

If required, the electrically conductive aid is added to the electrode. For the electrically conductive aid, it is preferable to use graphite, carbon black, carbon fibers, and metals such as nickel, aluminum, copper and silver, among which graphite and carbon black are particularly preferred.

The electrode should preferably have a composition comprising an active substance, an electrically conductive aid and a gel electrolyte at a weight ratio of 30 to 90:0 to 10:10 to 70 for the cathode, and 30 to 90:0 to 10:10 to 70 for the anode. The gel electrolyte is not critical to the practice of the present invention, and so may be selected from those ordinarily used in the art. A gel electrolyte-free electrode, too, may be used with about 3 to 30% by weight of a binder such as fluororesin and fluorine-containing rubber.

In the present invention, the aforesaid anode active substance and/or cathode active substance, preferably both active substances, are mixed with the gel electrolyte or binder to bond them to the surface of a collector.

For battery production, the active substances, with the electrically conductive aid if required, are dispersed in a gel electrolyte solution or a binder solution to prepare a coating solution.

Then, this electrode-coating solution is coated on the collector. No particular limitation is placed on coating means; the coating means used may be determined depending on the material and shape of the collector, etc. Generally, coating is carried out by suitable coating processes such as metal mask printing, electrostatic coating, dip coating, spray coating, roll coating, doctor blade coating, gravure coating, and screen printing processes. Thereafter, calendering is carried out by means of flat pressing, calender rolling or the like.

The collector used herein may be selected from ordinary collectors depending on the configuration of the device for which the battery is used, how to locate the collector in a case, etc. Generally, aluminum or the like may be used for the cathode and copper, nickel or the like may be used for the anode. It is here noted that the a metal foil, a metal mesh, etc. are ordinarily used for the collector. Although the metal mesh is lower than the metal foil in terms of contact resistance with the electrode, yet low-enough contact resistance is obtainable even with the metal foil.

Then, the solvent is evaporated off to prepare an electrode. A preferable range of coating thickness is about 50 to 400 $\mu$m.

The thus obtained cathode, solid electrolyte and anode are laminated and compressed together in this order to obtain a battery blank.

Electric Double-Layer Capacitor

The solid electrolyte and electrode according to the present invention are also effective for electric double-layer capacitors.

The collector used for a polarizable electrode may be formed of an electrically conductive rubber such as electrically conductive butyl rubber or may be formed by spraying of a metal such as aluminum, and nickel. This electrode layer may be additionally provided on one side with a metal mesh.

In the electric double-layer capacitor, such a polarizable electrode as mentioned above is combined with the solid electrolyte.

For an insulating gasket, it is preferable to use an insulating material such as polypropylene, and butyl rubber.

No particular limitation is imposed on the structure of the electric double-layer capacitor for which the solid electrolyte of the present invention is used. Usually, a pair of polarizable electrodes are located with the solid electrolyte interleaved between them, and insulating gaskets are disposed around the polarizable electrodes and solid electrolyte. Such an electric double-layer capacitor may be in a suitable form called a coil, paper or laminated type.

EXAMPLE

The present invention is now explained more specifically with reference to some examples.

Example 1

Using the following materials, a microporous film was prepared as an electrolyte film. This microporous film was then used to prepare a solid electrolyte.

Twenty (20) parts by weight of poly(vinylidene fluoride) [Kynar 761 made by ELF ATOCHEM NORTH AMERICA, INC. (sample Nos. 1–3)] were dissolved in a mixed solution composed of 40 parts by weight of dimethylacetamide and 40 parts by weight of dioxane, and the solution was cast on a glass plate to a thickness of 200 $\mu$m, using a doctor blade method.

Immediately upon casting, the glass plate was immersed in a formation bath consisting of 80 parts by weight of dioxane and 20 parts by weight of water for 10 minutes for formation. Thereafter, the glass plate was washed in running water for 30 minutes, and then dried at 60° C. for 1 hour, thereby obtaining a 50 µm thick microporous film comprising a poly(vinylidene fluoride) homopolymer.

The obtained microporous film had a porosity of 70% and a pore diameter of 0.2 µm.

To impart adhesion to the surface of the aforesaid microporous film, it is acceptable to deposit a polyolefinic material thereon by means of spraying or the like.

Then, this solid electrolyte sheet was impregnated with an electrolysis solution (hereinafter EL for short) (1M $LiPF_6$/EC+DMC (EC:DMC=1:2 (by volume)), thereby obtaining a solid electrolyte.

The obtained solid electrolyte sample Nos. 1–6 were measured for their ionic conductivity at 25° C. by an a.c. impedance measuring method. To this end, each sample was cut out to a round piece of 15 mm in diameter, which was in turn sandwiched between round SUS 304 electrodes of 20 mm in diameter. For the measuring device, an impedance analyzer Type SI1255 made by Solar Toron Co., Ltd. was used.

Furthermore, the obtained solid electrolyte was used for battery production.

$LiCoO_2$, acetylene black and PVDF Kynar 741 were used as the cathode active substance, electrically conductive aid and binder, respectively.

$LiCoO_2$, acetylene black and PVDF were weighed in such a way as to provide a weight ratio of 83:6:11, and acetone was added to these materials in such a way as to provide a acetone-to-PVDF weight ratio of 9:1. These materials were then mixed together at room temperature to obtain a cathode-forming slurry.

Mesocarbon microbeads (MCMB) and acetylene black were used as the anode active substance and electrically conductive aid, respectively.

MCMB, acetylene black and PVDF were weighed in such a way as to provide a weight ratio of 85:3:12, and acetone was added to these materials in such a way as to provided a acetone-to-PVDF weight ratio of 9:1. These materials were mixed together at room temperature to obtain an anode-forming slurry.

Each of the thus obtained cathode- and anode-forming slurries was coated by a doctor blade method on a PET film, and the acetone was then evaporated off at room temperature for sheet making.

The thus obtained solid electrolyte sample Nos. 1–3, cathode and anode were cut to sheets of given size. Then, the sheets were thermally laminated together at 130 to 160° C. Thereafter, the cathode was thermally laminated thereon with an aluminum grid previously coated with an electrically conductive adhesive agent in the form of a collector and the anode was thermally laminated thereon with a copper grid previously coated with an electrically conductive adhesive agent in the form of a collector. The laminate was impregnated with an electrolysis solution consisting of 1M $LiPF_6$/EC+DMC (EC+DMC=1:2 by volume), and then sealed up in an aluminum laminate pack to prepare a lithium secondary battery.

The discharge performance of the thus prepared battery sample Nos. 1 to 3 was examined. The rate performance, given below, is here defined by the ratio between 2C discharge capacity (capacity upon discharged at a constant current of 800 mA) and 0.2C discharge capacity (capacity upon discharged at a constant current of 80 mA). The results are shown in Table 1.

Comparative sample Nos. 1 to 3 prepared using PVDF copolymer Kynar 2801, too, were estimated in the same manner. The microporous films in comparative sample Nos. 1 to 3 were found to have a porosity of 60% and a pore diameter of 0.08 µm.

TABLE 1

| Sample No. | Material | Conductivity (mΩ) | Rate Performance (2C/0.2C) |
|---|---|---|---|
| 1 | PVDF761 | 3.7 | 0.93 |
| 2 | PVDF761 | 3.6 | 0.91 |
| 3 | PVDF761 | 3.8 | 0.92 |
| 4 | PVDF741 | 3.5 | 0.87 |
| 5 | PVDF741 | 3.5 | 0.85 |
| 6 | PVDF741 | 3.6 | 0.86 |
| Comp. 1 | PVDF2801 | 2.3 | 0.80 |
| Comp. 2 | PVDF2801 | 2.1 | 0.79 |
| Comp. 3 | PVDF2801 | 2.2 | 0.80 |

As can be seen from Table 1, inventive samples Nos. 1 to 3 are substantially equivalent in conductivity to the comparative samples.

Illustrated in FIG. 1 is the charge/discharge performance of inventive sample No. 3 (indicated by a solid line) and comparative sample No. 1 (indicated by a broken line). As can be seen from FIG. 1, the charge/discharge performance of inventive sample No. 3 is superior to that of the comparative sample.

Example 2

Solid electrolyte sample Nos. 4 to 6 and batteries were obtained and estimated in terms of conductivity and rate performance as in Example 1 with the exception that the following homopolymer was used as the microporous film-forming material.
Microporous film material: PVDF homopolymer Kynar 741 (ELF ATOCHEM NORTH AMERICA, INC.)

The microporous films in the inventive samples were found to have a porosity of 70% and a pore diameter of 0.3 µm. The results are already shown in Table 1.

Example 3

Batteries were obtained and estimated in terms of rate performance as in Example 1 with the exception that the following homopolymer was used as the microporous film-forming material and its porosity and pore diameter were changed as shown in Table 2.
Microporous film material: PVDF homopolymer Kynar 761 (ELF ATOCHEM NORTH AMERICA, INC.)

The results are shown in Table 2.

TABLE 2

| Sample No. | Porosity (%) | Pore Diameter (µm) | Rate Performance (2C/0.2C) |
|---|---|---|---|
| 21 | 18 | 0.005 | 0.41 |
| 22 | 35 | 0.01 | 0.51 |
| 23 | 60 | 0.02 | 0.70 |
| 24 | 65 | 0.1 | 0.80 |
| 25 | 70 | 0.4 | 0.90 |
| 26 | 75 | 0.5 | 0.93 |
| 27 | 80 | 1.2 | Short circuit |
| 28 | 60 | 1.3 | Short circuit |

As can be seen from Table 2, satisfactory rate performance is achievable at a porosity of 55% or greater and a pore diameter of 0.02 µm to 0.5 µm inclusive. At a porosity exceeding 80%, however, short circuits occur.

Example 4

Batteries obtained using the microporous films prepared in Examples 1 to 3 as well as batteries obtained using the following material as plasticized PVDF as set forth in U.S. Pat. Nos. 5,296,318 and 5,418,091 were measured for the rate of occurrence of short circuits. The rate of occurrence of short circuits was estimated in terms of how many batteries out of 30 batteries were short-circuited.

Microporous film material: PVDF Kynar 2801 (ELF ATOCHEM NORTH AMERICA, INC.)

The microporous film in the comparative sample was found to have a porosity of 55% and a pore diameter of 0.03 µm.

The results are shown in Table 3.

TABLE 3

Rate of Occurrence of Short Circuits

| Material | Rate of Occurrence (%) |
|---|---|
| PVDF741 | 14 |
| PVDF761 | 0 |
| K301 | 0 |
| PVDF2801* | 54 |

*) Shows the comparative sample.

As can be seen from Table 3, the inventive samples are much more reduced than the comparative sample in terms of the rate of occurrence of short circuits. When PVDF Kynar 761 and Kynar k301 are used, the rate of occurrence can be particularly reduced.

It was also found that when materials having a melt viscosity of 1,500 Pa·s$^{-1}$ (230° C., 100 s$^{-1}$) or greater, a melting point of 150° C. or higher and a heat of fusion of 30 J/g are used in the aforesaid examples, more preferable results are obtainable.

Sample Nos. 101 to 103 were prepared as in Example 1 with the exception that PVDF Kynar 761 was used for the material, and their rate performance was then estimated as in Example 1. At the same time, comparative samples were prepared by the method set forth typically in JP-A 9-259923, and measured in the same manner. The results are shown in Table 4.

TABLE 4

| | Rate Performance (2C/0.2C) | |
|---|---|---|
| Sample No. | Wet phase inversion method | comparison |
| 101 | 0.93 | 0.81 |
| 102 | 0.91 | 0.84 |
| 103 | 0.94 | 0.79 |

As can be seen from Table 4, the samples prepared by the wet phase inversion method are superior in rate performance to the comparative samples.

In the above examples, the lithium ion secondary batteries were estimated. It is understood, however, that the present invention may be applied to electrochemical devices using microporous films, e.g., electric double-layer capacitors.

ADVANTAGES OF THE INVENTION

According to the present invention, it is thus possible to use a solid electrolyte using a microporous film of high crystallizability and high strength, thereby achieving an electrochemical device, a lithium ion secondary battery and an electric double-layer capacitor which can be further slimmed down and reduced in terms of the occurrence of short circuits with improved battery performance.

It is also possible to achieve an electrochemical device, a lithium ion secondary battery and an electric double-layer capacitor comprising a solid electrolyte using as an electrolyte film a microporous film having a suitable porosity without recourse to any plasticizer or the like.

Japanese Patent Application No. 11-276298 is herein incorporated by reference.

While the invention has been described in detail and with reference to specific embodiments thereof, it will be apparent to one skilled in the art that various changes and modifications may be made therein without departing from the spirit and scope thereof.

What we claim is:

1. A solid electrolyte comprising a microporous film, and an electrolysis solution comprising an electrolyte salt and a solvent, wherein said microporous film is prepared by a wet phase inversion method, and has a porosity of 50% or greater and a pore diameter of 0.02 µm to 2 µm.

2. The solid electrolyte according to claim 1, wherein said wet phase inversion method comprises solidifying a polymer solution in a solution comprising a phase-inverting organic solvent and water at a weight ratio of 100:0 to 60:40.

3. The solid electrolyte according to claim 1 or 2, wherein said microporous film comprises a polymer having a melt viscosity of 1,500 Pa·s$^{-1}$ (230° C., 100 s$^{-1}$) or greater.

4. The solid electrolyte according to claim 1, wherein said microporous film comprises a polymer having a melting point of 150° C. or greater and a heat of fusion of 30 J/g or greater.

5. The solid electrolyte according to claim 1, wherein said microporous film comprises a poly(vinylidene fluoride) homopolymer.

6. An electrochemical device comprising the solid electrolyte of claim 1.

7. The electrochemical device according to claim 6, wherein said electrochemical device is a lithium ion secondary battery.

8. The electrochemical device according to claim 6, wherein said electrochemical device is an electric double-layer capacitor.

9. The electrochemical device according to claim 6, further comprising an adhesive agent disposed on a surface of the solid electrolyte.

10. A process for preparing the solid electrolyte of claim 1, wherein a solution of a polymer dispersed and dissolved in an organic solvent is solidified in a solution comprising a phase-inverting organic solvent and water at a weight ratio of 100:0 to 60:40, thereby providing a microporous film having a porosity of 50% or greater and a pore diameter of 0.02 µm to 2 µm inclusive, then impregnating the microporous film with an electrolysis solution comprising an electrolyte salt and a solvent.

11. The process according to claim 10, wherein the polymer is a poly(vinylidene fluoride) homopolymer.

12. The solid electrolyte according to claim 1, wherein the electrolyte salt is selected from the group consisting of $LiPF_6$, $LiClO_4$, $LiBF_4$, $LiAsF_6$, $LiSO_3CF_3$, and $LiN(CF_3SO_2)_2$.

13. The solid electrolyte according to claim 1, wherein the solvent is selected from the group consisting of ethylene carbonate, propylene carbonate, butylene carbonate, dimethyl carbonate, diethyl carbonate, ethyl methyl carbonate, tetrahydrofuran, 2-methyltetrahydrofuran, 1,3-dioxolan, 4-methyldioxolan, γ-butyrolactone, sulfolane, 3-methylsulfolane, dimethoxyethane, diethoxyethane, ethoxymethoxyethane, ethyldiglyme, and mixtures thereof.

14. The solid electrolyte according to claim 1, wherein the electrolyte salt is present in the electrolysis solution at a concentration of 0.3 to 5 mol/l.

15. The solid electrolyte according to claim 1, wherein the electrolysis solution comprises 30 to 70% by weight of the solid electrolyte.

16. The solid electrolyte according to claim 1, wherein the solid electrolyte has a thickness of 5 to 100 μm.

\* \* \* \* \*